United States Patent [19]

Haass

[11] 4,041,239

[45] Aug. 9, 1977

[54] METHOD AND APPARATUS FOR THE TRANSMISSION OF DATA

[75] Inventor: Adolf Haass, Munich, Germany

[73] Assignee: Siemens Aktiengesellschaft, Munich, Germany

[21] Appl. No.: 503,167

[22] Filed: Sept. 4, 1974

[30] Foreign Application Priority Data

Sept. 24, 1973 Germany .............................. 2347898

[51] Int. Cl.² ............................................. H04L 3/00
[52] U.S. Cl. ................................... 178/68; 325/38 A
[58] Field of Search ................... 325/38 A, 41, 42, 65; 178/69 R, 69 N, 69 F, 68; 328/162, 163, 164

[56] References Cited

U.S. PATENT DOCUMENTS

| 3,747,024 | 7/1973 | Choquet et al. | 178/67 X |
| 3,801,911 | 4/1974 | Von Hörsten | 325/38 A |
| 3,806,807 | 4/1974 | Nakamura | 325/42 |
| 3,980,826 | 9/1976 | Widmer | 178/68 |

Primary Examiner—Benedict V. Safourek
Attorney, Agent, or Firm—Gerald L. Lett

[57] ABSTRACT

A method and apparatus for transmitting data so as to reduce the effects of signal distortions caused by the transmission medium are described. The data signal is encoded and formed into a combination of wide rectangular pulses and narrow rectangular pulses having a width equal to half that of the wide pulses. The wide pulse portion of the encoded signal is preliminarily distorted, and a combination of the distorted wide pulses and the narrow pulses is transmitted.

5 Claims, 12 Drawing Figures

METHOD AND APPARATUS FOR THE TRANSMISSION OF DATA

BACKGROUND OF THE INVENTION

The invention relates to a method and apparatus for the transmission of data over a transmission link, more particularly, in accordance with the invention such transmission is carried out with the aid of signals composed of wide rectangular pulses of a given pulse width and narrower rectangular pulses of half the pulse width.

In accordance with the so-called known diphase method, rectangular pulses of a given pulse width and narrower rectangular pulses of half the pulse width are produced in dependance upon the date to be transmitted. The loss pass filter characteristics of the transmission link, which become increasingly a factor with increasing line length, cause the rectangular pulses of various widths to become non-uniformly deformed, so that their zero transitions are unequally delayed and signal distortions occur. Signal distortions of this kind cause a limitation of the transmission range.

An object of the invention is, therefore, to provide a method and apparatus for transmitting data with the aid of which the signal distortions described hereinabove are reduced.

SUMMARY OF THE INVENTION

In accordance with the invention, the foregoing and other objects are achieved in a method and apparatus of transmitting data in which the signals are conducted to a preliminary distorting device, which from the wide rectangular pulses, produces preliminarily distorted pulses whose amplitudes are, at least in the region of the trailing edges, less than the corresponding amplitudes of the wide rectangular pulses. By combining the narrow rectangular pulses and the pre-distorted pulses, a pre-distorted signal is formed and is transmitted over the transmission link.

The method and apparatus in accordance with the invention provide a considerable reduction in the signal distortions, and thus, enables a substantial increase in the transmission range. The method and apparatus in accordance with the invention operates in digital, rather than analogue, fashion and can thus be realized with relatively little expense. A further advantage of the invention lies in the fact that it enables the pre-distortion to be set simply and in optimum fashion in dependence upon the particular length of the transmission link.

If the line over which the data are transmitted has a resistance-capacitance characteristic, it is advantageous to provide that during the first halves of the wide rectangular pulses the amplitudes of the pre-distorted pulses are equal to the amplitudes of the narrow rectangular pulses and that during the second halves of the wide rectangular pulses the amplitudes of the pre-distorted pulses are less than the amplitudes of the narrow rectangular pulses. When the line has RC characteristics, this technique is desirable because in this case only the final value of the wide rectangular pulses and the rise time are critical.

If the line across which the data is transmitted has inductive-capacitance characteristics, it is advantageous to provide that during the entire length of the wide rectangular pulses the amplitudes of the pre-distorted pulses are less than the corresponding amplitudes of the narrow rectangular pulses.

BRIEF DESCRIPTION OF THE DRAWINGS

The principles of the invention will be more readily understood by reference to a description of alternate perferred embodiments, described below, and in the twelve figures of drawings which are briefly described below.

DETAILED DESCRIPTION OF THE DRAWINGS

In the following description like elements are identified by like reference letters and numerals.

Figure 1:
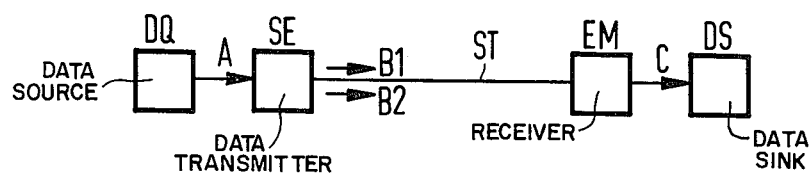
FIG. 1 is a block-schematic diagram of a prior art data transmission system.
Figure 2:
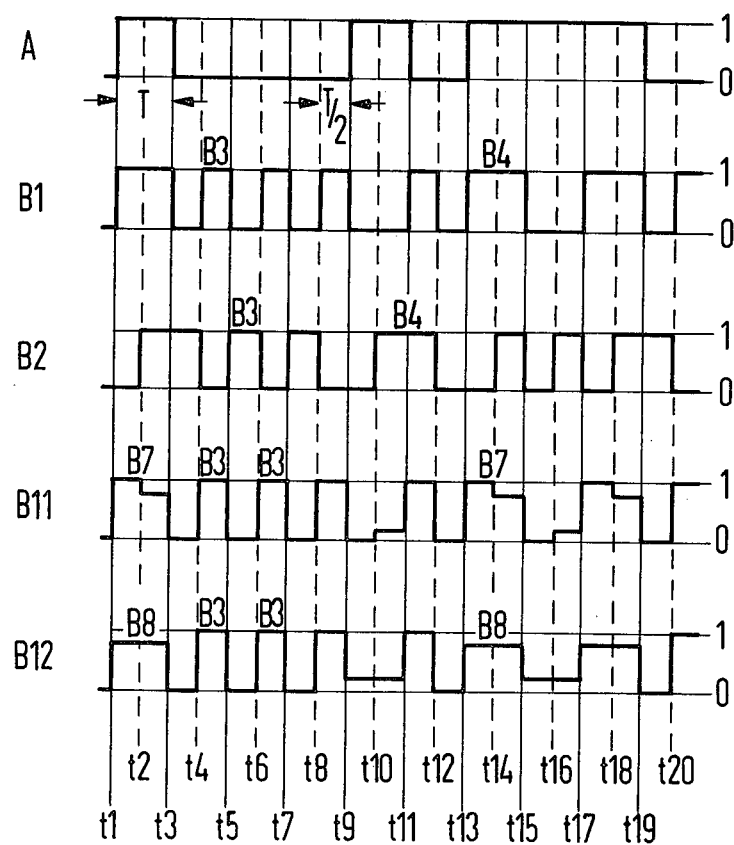
FIG. 2 is a waveform diagram showing signals which serve for data transmission.

FIG. 1 schematically illustrates a prior art data transmission system. Data source DQ emits a signal A to the transmitter SE. The signal A is illustrated in FIG. 2, and is a binary signal whose two binary values are referenced 0 and 1. The individual bits of the signal A are emitted in the time frame of a bit pattern which is represented by thin lines running in the ordinate direction. The lines of this bit pattern correspond to the times $t2$, $t3$, $t5$, . . . $t17$, $t19$ with odd indices. In this example the signal A represents the work 1000101110. The broken lines characterize the scanning times $t2$, $t4$, $t6$, . . . $t18$, $t20$ with even-numbered indices.

The transmitter SE is provided with a coder so that either the signal B1 or the signal B2 is emitted via the output of the transmitter SE. When the signal B2 is emitted, the transmission method is referred to as "normal disphase" method. When the signal B1 is emitted, the transmission method is referred to as "coded diphase" method. A common feature of the two signals B1 and B2 is that they are composed of rectangular pulses whose pulse lengths are either equal to the bit length T or equal to half the bit length T/2.

Coding techniques for producing the aforementioned signals B1 and B2 are well known in the art, and it is these known techniques which are to be used herein. If further details regarding an apparatus and its operations for producing such signals are needed, reference can be had to a publication entitled "Nonbinary Information Transmission" by R. F. J. Filipowsky appearing in the *Proceedings of the Institution of Radio and Electronics Engineers Australia*, Vol. 30, No. 12, Pages 377–479, Dec. 1969. Particular reference should be had to FIG. 13 therein and the corresponding descriptive material at page 409.

The signals B1 or B2 are conducted via a transmission link ST, for example via a cable or via a telephone line, to a receiver EM which contains a decoder. Signal C emitted by the receiver EM has the same information content as the signal A emitted from the data source DQ. The signal C is conducted to a data sink DS, for example, a teleprinter. The low pass filter characteristics of the transmission link ST which become increasingly manifest with increasing line length cause the transmission range to be limited.

Figure 3:
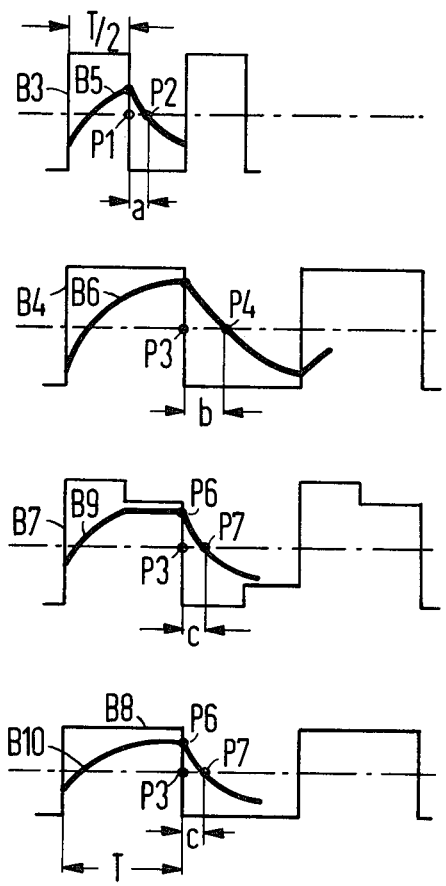
FIG. 3 is a series of partial waveform diagrams with the aid of which the effects of the transmission link will be explained.

In FIG. 3 is shown how the signals B1 and B2 are influenced by the transmission link ST. The pulses B3 and B4 have a length T/2 and T, respectively, and can be parts of the signals B1 or B2 represented in FIG. 2. The low pass filter characteristics of the transmission link ST cause the signal B3 to become the signal B5, so that the zero transition at point P1 of signal B5 is delayed and occurs at point P2. Thus, there is a delay $a$ of the zero transition. The low pass filter characteristics of the transmission link ST cause the signal B4 to become the signal B6, so that then the zero transition at point P3 is delayed by the delay time $b$ and occurs at point P4. Thus, a signal distortion occurs which is equal to the amount $b$ minus $a$.

Figure 4:
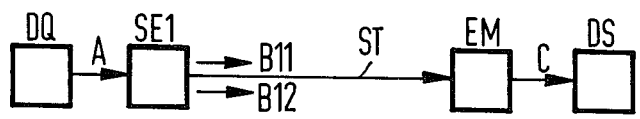
FIG. 4 is a block-schematic diagram of a data transmission system in which the transmitted signals are pre-distorted.

FIG. 4 shows a data transmission system in which, instead of the transmitter SE illustrated in FIG. 1, the transmitter SE1 is provided which emits the signals B11 or B12. The signal B11 consists, in accordance with FIG. 2, of the pulses B7 and B3, whereas the signal B12 consists of the pulses B8 and B3. In order to reduce the distortion described in FIG. 3, either the pulses B7 or the pulses B8 are transmitted in place of the rectangular pulses B4.

As shown in FIG. 3, in the case of the signal B7 the low pass filter characteristics of the transmission link ST cause the signal B9 to be produced at the receiving end, and in the case of the signal B8 cause the signal B10 to be produced at the receiving end. In both cases from the point P6 until the point P7 there is a virtually identical waveform between the signals B9 and B10, so that in both cases the zero transition at point P3 is delayed by the delay $c$ which is approximately equal to the delay $a$. Thus, the zero transitions of the signals transmitted across the transmission link ST are delayed by an approximately equal amount, irrespective of whether this is a narrow rectangular pulse B3 or a wide rectangular pulse B4. In the case of the pre-distorted signal B7 the amplitude of the pre-distorted signal is reduced after approximately a time T/2 relative to the amplitude of the rectangular pulses B4. In the case of the pre-distorted pulses B8 the amplitude of these pulses B8 is reduced in comparsion to the amplitude of the rectangular pulses B4 for the entire duration T.

Figure 5:
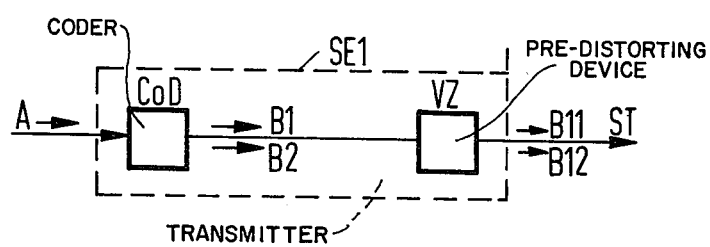
FIG. 5 is a schematic illustration of the transmitter in the FIG. 4 embodiment.

FIG. 5 schematically illustrates the transmitter SE1 in the FIG. 4 embodiment comprising a coder COD and a preliminary distorting device VZ. The signal A is conducted to the coder COD and is converted either into the signal B1 or into the signal B2. The preliminary distorting device VZ is used to produce the signal B11 or B12.

Figure 6:
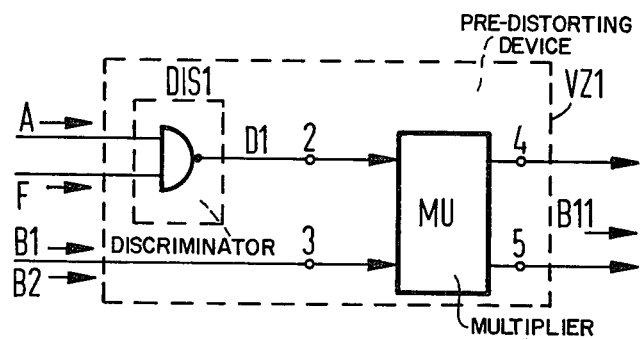
FIG. 6 is a schematic diagram of a preferred embodiment of a preliminary distorting device with a discriminator and a multiplication stage.

FIG. 6 shows a first preferred embodiment VZ1 of the preliminary distorting device VZ which is schematically illustrated in FIG. 5. The preliminary distorting device VZ1 comprises a discriminator DIS1 and a multiplier MU. With the aid of the discriminator DIS1 a discriminator signal D1 is produced which indicates the time from which one of the rectangular pulses of the signal B1 or B2 is wider than half the pulse width T/2. The signal D1 is conducted across the circuit point 2, and one of the signals B1 or B2 is conducted across the circuit point 3. The signal B11 is emitted via the circuit points 4 and 5.

Figure 7:
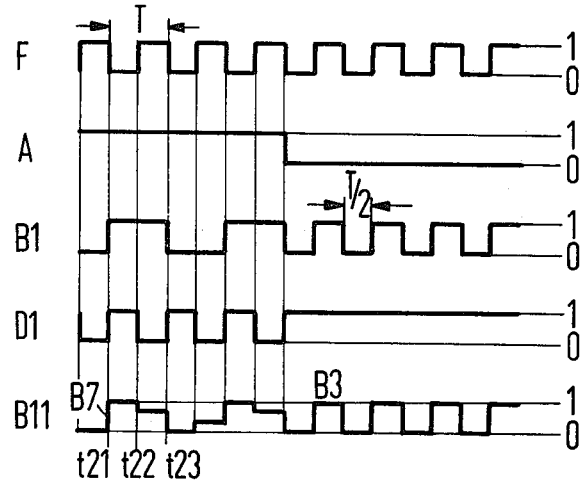
FIG. 7 is a waveform diagram with the aid of which the effects of the discriminator shown in FIG. 6 will be explained.

The discriminator DIS1 consists of a NAND gate which emits a 1-signal whenever a 0-signal appears at one of the inputs. The mode of operation of a discriminator DIS1 can be seen in the diagram in FIG. 7. The rectangular pulses of the timing signal F have a pulse width T/2. The signal A supplied at the input is shown on an enlarged scale in FIG. 7. In dependance upon the 0 or 1 value of the signal A, the signal B1 is formed. The 1 values of the signal F and the 1 value of the signal A produce the 0 values of the signal D1, whereas otherwise, the signal D1 assumes 1 values. With the signal D1=1 the amplitude of the signal B1 is multiplied with the factor one and, therefore, is not changed, whereas with the signal D1=0 the amplitude of the signal B1 is multiplied with a factor which is lower than one. For example, from the time $t21$ until the time $t22$ the amplitude of the signal B1 is not altered. From the time $t22$ until the time $t23$, however, the amplitude of the signal B11 is lower than the amplitude of the signal B1. The narrow rectangular wave pulses with the pulse width T/2 of the signal B1 are not changed, however. In this way the pre-distorted signal B11 is formed.

Figure 8:
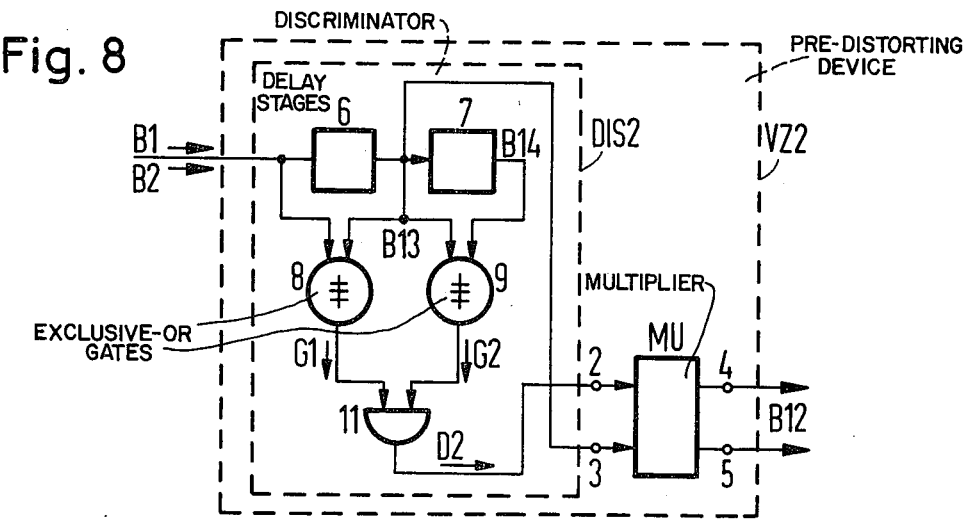
FIG. 8 is a schematic diagram of a second exemplary embodiment of a preliminary distorting device.

FIG. 8 shows a second preferred embodiment VZ2 of the preliminary distorting device VZ schematically illustrated in FIG. 5. The preliminary distorting device VZ2 comprises stages 6 and 7 of a shift register, of EXCLUSIVE-OR gates 8 and 9, and of the AND gate 11 which form the discriminator DIS2 and of the multiplication stage MU.

Figure 9:
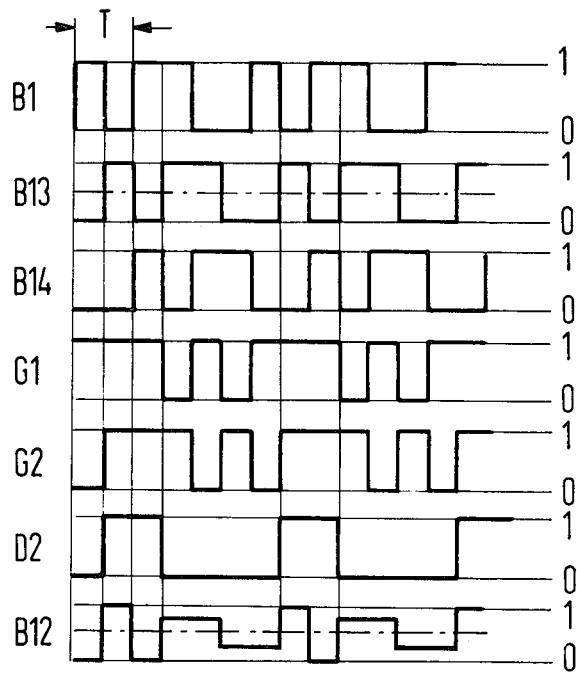
FIG. 9 is a waveform diagram with which the mode of operation of the preliminary distorting device shown in FIG. 7 is explained.

FIG. 9 illustrates signals with the aid of which the mode of operation of the preliminary distorting device VZ2 shown in FIG. 8 will be explained. For example, it is assumed that the discriminator DIS2 is supplied with the signal B1. The stages 6 and 7 delay the signal B1 in each case by a time T/2, so that the signals B13 and B14 are produced at the outputs of these stages. The EXCLUSIVE-OR gates 8 and 9 emit 1 signals when the signals with which they are supplied at their inputs differ. In this way the signals G1 and G2 are emitted from the gates 8 and 9, respectively, and the signal D2 is emitted from the AND gate 11. The signal D2 assumes a 0 value whenever there is a wide pulse of the signal B13.

The multiplication stage MU carries out a multiplication of the signal amplitudes of the signals B13 and D2, in which the amplitudes of the signal B13 are not changed when the signal D2 assumes its 1 value, whereas the amplitudes of the signal B13 are reduced when the signal D2 in each case assumes 0 values.

Figure 10:
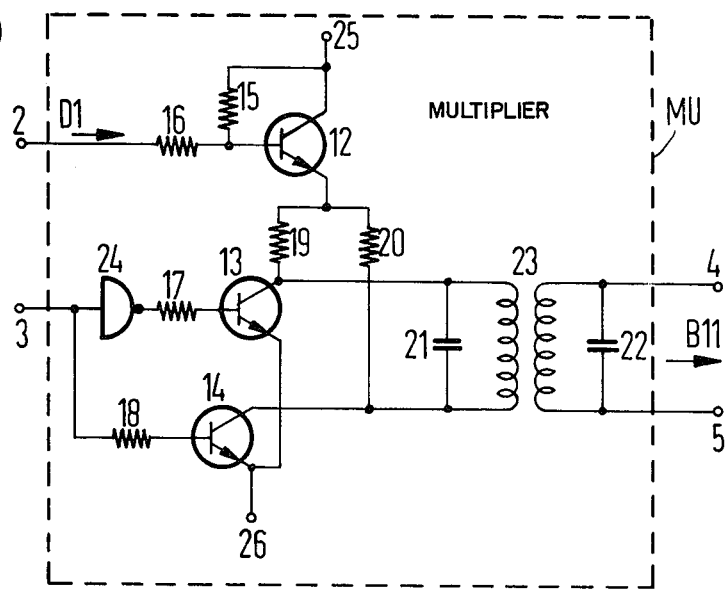
FIG. 10 is a schematic diagram of a preferred embodiment of a multiplication stage.

In FIG. 10 is illustrated an amplifier which can, for example, be used as multiplication stage MU. This amplifier comprises transistors 12, 13, and 14, resistors 15, 16, 17, 18, 19, and 20, capacitors 21 and 22, transformer 23 and an inverter 24. Terminals 25 and 26 are connected, respectively, to the positive pole (+5V) and to the negative pole (0V) of an operating voltage source.

Figure 11:
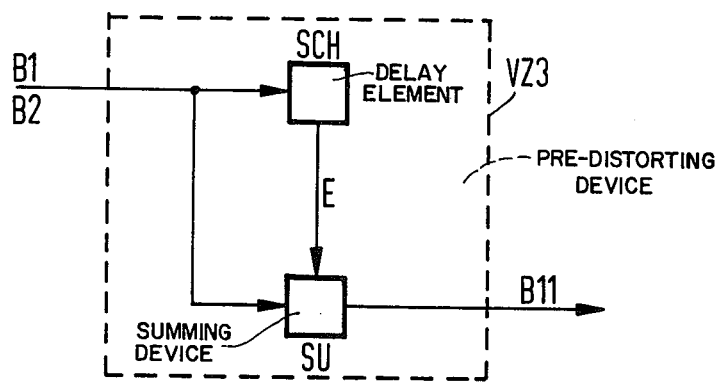
FIG. 11 is a block-schematic diagram of a third exemplary embodiment of a preliminary distorting device.

FIG. 11 shows a further preferred embodiment VZ3 of the preliminary distorting device VZ which is schematically illustrated in FIG. 5. The preliminary distorting device VZ3 comprises a delay element SCH, which can be designed as shift register, and of a conventionally constructed summing device SU.

Figure 12:
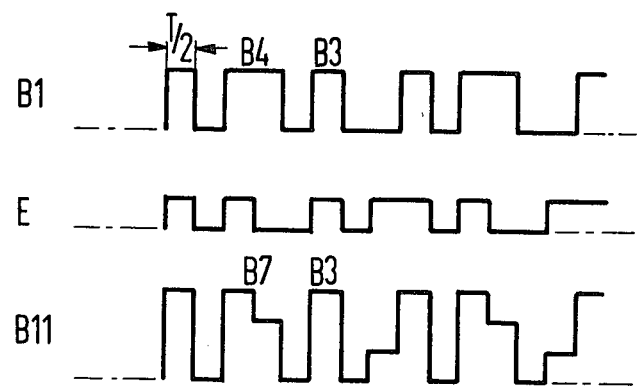
FIG. 12 is a waveform diagram with which the mode of operation of the preliminary distorting device illustrated in FIG. 11 is explained.

The mode of operation of this preliminary distorting device VZ3 can be seen from the diagrams in FIG. 12. It is, for example, assumed that the preliminary distorting device is supplied with signal B1 by the coder COD. Using the delay element SCH the signal B1 is delayed by the time T/2, and is emitted with reversed polarity, so that the signal E is produced. In the summing element SU the signals B1 and E are added, the dash-dotted lines being intended to represent zero lines. In this way is formed the pre-distorted signal B11 which contains the narrow rectangular pulses B3 of the signal B1 and, instead of the wide rectangular pulses B4, contains pulses B7 whose amplitudes are reduced from half the pulse width onwards.

The several preferred embodiments of the invention described hereinabove are intended only to be exemplary of the principles of the invention. It is contemplated that the described embodiments can be modified or changed in a number of ways, obvious to those skilled in the art, while remaining within the scope of the invention, as defined by the appended claims.

I claim:

1. Apparatus for transmitting data so as to reduce the effects of signal distortions caused by a transmission medium, comprising:
   a source of data signals,
   encoding means for forming from said data signals a combination of wide rectangular pulses and narrow rectangular pulses having a pulse width equal to half the width of said wide rectangular pulses,
   discriminator means for producing a discriminator signal upon the appearance of a said wide rectangular pulse,
   multiplier means for producing a pre-distorted signal by multiplying said encoded data signal with said discriminator signal and
   means for transmitting said pre-distorted signal and said narrow rectangular pulses over the transmission medium.

2. The apparatus defined in claim 1 wherein said discriminator means comprises a logic gate which has as inputs said data signal and a signal characterizing the pulse edges of said narrow rectangular pulses.

3. The apparatus defined in claim 1 wherein said discriminator comprises:
   a shift register having first and second stages which are supplied with said encoded data signals,
   first EXCLUSIVE-OR gate means having an input connected to an input and output of said first stage,
   second EXCLUSIVE-OR gate means having an input connected to an input and an output of said second stage,
   AND gate means having inputs connected to outputs of said first and second EXCLUSIVE-OR gate means, the output of said AND gate forming said discriminator signal.

4. The apparatus defined in claim 1 wherein said multiplier means comprises an amplifier having an amplification factor controlled by said discriminator signal.

5. A method for the transmission of data signals whereby the effects of signal distortions caused by the transmission medium are reduced, comprising:
   generating said data signals,
   encoding said data signals to form encoded data signals comprising wide rectangular pulses and narrow rectangular pulses having a pulse width equal to half the width of said wide rectangular pulses,
   delaying said encoded data signals for a period equal to the pulse width of said narrow rectangular pulses,
   inverting said delayed encoded data signals,
   adding said inverted signals and said encoded data signals to produce a predistorted signal and
   transmitting said predistorted signal over the transmission medium.

* * * * *